(12) United States Patent
Brown et al.

(10) Patent No.: US 10,639,952 B2
(45) Date of Patent: May 5, 2020

(54) VEHICLE SUSPENSION

(71) Applicant: Mahindra N.A. Tech Center, Troy, MI (US)

(72) Inventors: Matthew T. Brown, South Lyon, MI (US); Gurdeep S. Pahwa, Troy, MI (US)

(73) Assignee: Mahindra N.A. Tech Center, Auburn Hills, MI (US)

( * ) Notice: Subject to any disclaimer, the term of this patent is extended or adjusted under 35 U.S.C. 154(b) by 111 days.

(21) Appl. No.: 15/922,219

(22) Filed: Mar. 15, 2018

(65) Prior Publication Data
US 2019/0168559 A1   Jun. 6, 2019

(30) Foreign Application Priority Data

Dec. 1, 2017   (IN) .............................. 201721043235

(51) Int. Cl.
*B60G 9/00*     (2006.01)
*B60G 21/02*    (2006.01)
*B60G 21/05*    (2006.01)

(52) U.S. Cl.
CPC ............ *B60G 9/00* (2013.01); *B60G 21/026* (2013.01); *B60G 21/05* (2013.01); *B60G 2200/314* (2013.01); *B60G 2200/342* (2013.01); *B60G 2204/421* (2013.01); *B60G 2204/4222* (2013.01)

(58) Field of Classification Search
CPC ........ B60G 2200/314; B60G 2200/342; B60G 2204/421; B60G 2204/4222; B60G 9/00; B60G 21/026; B60G 21/05
See application file for complete search history.

(56) References Cited

U.S. PATENT DOCUMENTS

| | | | | | |
|---|---|---|---|---|---|
| 3,497,233 | A | * | 2/1970 | Bolaski, Jr. ............ | B60G 7/006 280/86.757 |
| 3,532,334 | A | * | 10/1970 | Mays ..................... | B60G 17/08 267/187 |
| 3,602,524 | A | * | 8/1971 | Rutzenhofer ........ | B60G 21/073 280/124.107 |
| 4,573,702 | A | * | 3/1986 | Klem ...................... | B62D 9/02 280/5.504 |
| 5,456,486 | A | * | 10/1995 | Lee ......................... | B60G 7/02 280/124.107 |

(Continued)

FOREIGN PATENT DOCUMENTS

| | | | | |
|---|---|---|---|---|
| JP | 62268717 A | * | 11/1987 | ............... B60G 9/00 |
| JP | 08040039 A | * | 2/1996 | |

*Primary Examiner* — Laura Freedman
(74) *Attorney, Agent, or Firm* — Harness, Dickey & Pierce, P.L.C.

(57) ABSTRACT

A vehicle suspension may include a crank bar and first and second lateral links. The crank bar is mounted to an axle assembly and is rotatable relative to the axle assembly about a first axis. The first lateral link may include a first end rotatably coupled to a first bracket fixed to a chassis of the vehicle and a second end coupled to the crank bar for rotation about a second rotational axis. The second lateral link may include a third end rotatably coupled to a second bracket fixed to the chassis and a fourth end coupled to the crank bar for rotation about a third rotational axis. A straight line having an infinite length may intersect the first rotational axis and one of the second and third rotational axes does not intersect the other of the second and third rotational axes.

17 Claims, 6 Drawing Sheets

(56) References Cited

U.S. PATENT DOCUMENTS

| | | | | |
|---|---|---|---|---|
| 5,458,359 A | * | 10/1995 | Brandt | B60G 9/00 180/349 |
| 6,511,078 B2 | * | 1/2003 | Sebe | B60G 3/01 280/124.103 |
| 7,357,400 B2 | * | 4/2008 | Serra | B60G 7/008 280/124.134 |
| 2002/0047303 A1 | * | 4/2002 | Hosotani | B60G 9/00 301/125 |

* cited by examiner

VEHICLE SUSPENSION

CROSS-REFERENCE TO RELATED APPLICATIONS

This application claims the benefit and priority of Indian Application No. 201721043235 filed Dec. 1, 2017. The entire disclosure of the above application is incorporated herein by reference.

FIELD

The present disclosure relates to a suspension for a vehicle.

BACKGROUND

This section provides background information related to the present disclosure and is not necessarily prior art.

Automotive vehicles typically include a suspension system for damping relative movement between a chassis and an axle of the vehicle. Such relative movement can be caused by forces associated with bumps or irregularities on a driving surface, forces associated with acceleration or deceleration of the vehicle, and/or centrifugal forces while the vehicle is cornering. Vehicle suspensions can include a linkage (e.g., a Watt's linkage) that limits lateral movement of an axle relative to the chassis caused by such forces. The present disclose provides such a linkage that directs movement of the axle in a path that more closely approximates a straight vertical line relative to the chassis while improving the stiffness of the suspension system.

SUMMARY

This section provides a general summary of the disclosure, and is not a comprehensive disclosure of its full scope or all of its features.

The present disclosure provides a suspension for a vehicle. The suspension may include a crank bar, a first lateral link, and a second lateral link. The crank bar may be mounted to an axle assembly of the vehicle and is rotatable relative to the axle assembly about a first rotational axis. The first lateral link may include a first end rotatably coupled to a first bracket fixed to a chassis of the vehicle and a second end coupled to the crank bar for rotation relative to the crank bar about a second rotational axis. The second rotational axis may be parallel to and spaced apart from the first rotational axis. The second lateral link may include a third end rotatably coupled to a second bracket fixed to the chassis of the vehicle and a fourth end coupled to the crank bar for rotation relative to the crank bar about a third rotational axis. The third rotational axis may be parallel to and spaced apart from the first and second rotational axes. A straight line having an infinite length may intersect the first rotational axis and one of the second and third rotational axes does not intersect the other of the second and third rotational axes.

In some configurations, the crank bar rotates relative to the axle assembly in response to relative movement between the axle assembly and the chassis.

In some configurations, the straight line intersects the first rotational axis and the third rotational axis and is disposed laterally between the second rotational axis and the first bracket.

In some configurations, the first lateral link is disposed at a non-perpendicular and non-zero angle relative to the second lateral link.

In some configurations, the first lateral link is disposed vertically higher than the second lateral link.

In some configurations, the second rotational axis extends through a first end of the crank bar, the third rotational axis extends through a second end of the crank bar, and the first rotational axis extends through an intermediate portion of the crank bar disposed between the first and second ends of the crank bar.

In some configurations, the first and second brackets are disposed at opposite lateral ends of the chassis.

In some configurations, the crank bar is rotatably mounted on a differential housing of the axle assembly disposed laterally between the opposite lateral ends of the chassis.

In some configurations, the first and second lateral links are rigid members having fixed lengths.

In some configurations, the first and second lateral links are disposed at non-perpendicular and non-zero angles relative to a longitudinal axis of the axle assembly.

The present disclosure also provides a vehicle that may include a chassis, an axle assembly, a plurality of springs, a crank bar, a first lateral link, and a second lateral link. The chassis may include a first lateral end having a first rigid bracket extending therefrom and a second lateral end having a second rigid bracket extending therefrom. The axle assembly may be movably connected to the chassis. The plurality of springs may be connected to the chassis and the axle assembly and may dampen relative movement between the chassis and the axle assembly. The crank bar may be mounted to the axle assembly and may rotate relative to the axle assembly about a first rotational axis. The first lateral link may include a first end rotatably coupled to the first rigid bracket and a second end coupled to the crank bar for rotation relative to the crank bar about a second rotational axis. The second rotational axis may be parallel to and spaced apart from the first rotational axis. The second lateral link may include a third end rotatably coupled to the second rigid bracket and a fourth end coupled to the crank bar for rotation relative to the crank bar about a third rotational axis. The third rotational axis may be parallel to and spaced apart from the first and second rotational axes. The first, second and third rotational axes may be positioned relative to each other such that a straight line having an infinite length intersects only two of the first, second and third rotational axes.

Further areas of applicability will become apparent from the description provided herein. The description and specific examples in this summary are intended for purposes of illustration only and are not intended to limit the scope of the present disclosure.

DRAWINGS

The drawings described herein are for illustrative purposes only of selected embodiments and not all possible implementations, and are not intended to limit the scope of the present disclosure.

Corresponding reference numerals indicate corresponding parts throughout the several views of the drawings.

DETAILED DESCRIPTION

Figure 1:
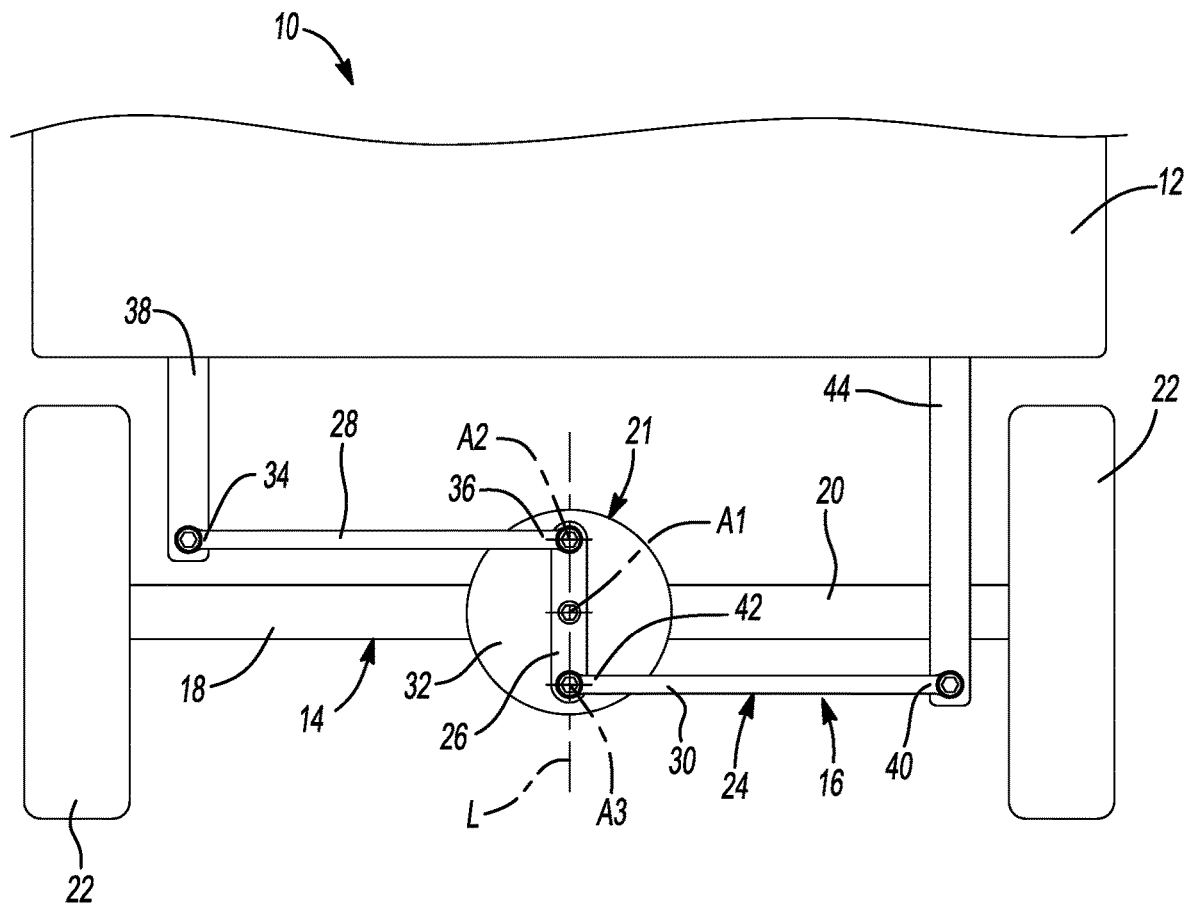
FIG. 1 is a schematic representation of a portion of a vehicle having a prior-art suspension.

Example embodiments will now be described more fully with reference to the accompanying drawings.

Example embodiments are provided so that this disclosure will be thorough, and will fully convey the scope to those who are skilled in the art. Numerous specific details are set forth such as examples of specific components, devices, and methods, to provide a thorough understanding of embodiments of the present disclosure. It will be apparent to those skilled in the art that specific details need not be employed, that example embodiments may be embodied in many different forms and that neither should be construed to limit the scope of the disclosure. In some example embodiments, well-known processes, well-known device structures, and well-known technologies are not described in detail.

The terminology used herein is for the purpose of describing particular example embodiments only and is not intended to be limiting. As used herein, the singular forms "a," "an," and "the" may be intended to include the plural forms as well, unless the context clearly indicates otherwise. The terms "comprises," "comprising," "including," and "having," are inclusive and therefore specify the presence of stated features, integers, steps, operations, elements, and/or components, but do not preclude the presence or addition of one or more other features, integers, steps, operations, elements, components, and/or groups thereof. The method steps, processes, and operations described herein are not to be construed as necessarily requiring their performance in the particular order discussed or illustrated, unless specifically identified as an order of performance. It is also to be understood that additional or alternative steps may be employed.

When an element or layer is referred to as being "on," "engaged to," "connected to," or "coupled to" another element or layer, it may be directly on, engaged, connected or coupled to the other element or layer, or intervening elements or layers may be present. In contrast, when an element is referred to as being "directly on," "directly engaged to," "directly connected to," or "directly coupled to" another element or layer, there may be no intervening elements or layers present. Other words used to describe the relationship between elements should be interpreted in a like fashion (e.g., "between" versus "directly between," "adjacent" versus "directly adjacent," etc.). As used herein, the term "and/or" includes any and all combinations of one or more of the associated listed items.

Although the terms first, second, third, etc. may be used herein to describe various elements, components, regions, layers and/or sections, these elements, components, regions, layers and/or sections should not be limited by these terms. These terms may be only used to distinguish one element, component, region, layer or section from another region, layer or section. Terms such as "first," "second," and other numerical terms when used herein do not imply a sequence or order unless clearly indicated by the context. Thus, a first element, component, region, layer or section discussed below could be termed a second element, component, region, layer or section without departing from the teachings of the example embodiments.

Spatially relative terms, such as "inner," "outer," "beneath," "below," "lower," "above," "upper," and the like, may be used herein for ease of description to describe one element or feature's relationship to another element(s) or feature(s) as illustrated in the figures. Spatially relative terms may be intended to encompass different orientations of the device in use or operation in addition to the orientation depicted in the figures. For example, if the device in the figures is turned over, elements described as "below" or "beneath" other elements or features would then be oriented "above" the other elements or features. Thus, the example term "below" can encompass both an orientation of above and below. The device may be otherwise oriented (rotated 90 degrees or at other orientations) and the spatially relative descriptors used herein interpreted accordingly.

With reference to FIG. 1, a prior-art vehicle 10 is provided that includes a chassis 12, an axle assembly 14, and a suspension 16. While not shown in FIG. 1, the chassis 12 can support a body of the vehicle and a propulsion system (e.g., an engine or motor). The axle assembly 14 can include first and second axles 18, 20, and a differential 21 that couples the first and second axles 18, 20 to a driveshaft (not shown) driven by the propulsion system. In this manner, movement of the driveshaft can be transmitted to wheels 22 attached to the first and second axles 18, 20.

The suspension 16 includes a linkage (e.g., a Watt's linkage) 24 having a crank bar 26, a first lateral link 28, and a second lateral link 30. The crank bar 26 is mounted to a housing 32 of the differential 21 for rotation relative to the housing 32 about a first rotational axis A1. The first lateral link 28 includes a first end 34 and a second end 36. The first end 34 is rotatably coupled to a first bracket 38 fixed to the chassis 12. The second end 36 is coupled to the crank bar 26 for rotation relative to the crank bar 26 about a second rotational axis A2. The second rotational axis A2 is parallel to and spaced apart from the first rotational axis A1. The second lateral link 30 includes a first end 40 and a second end 42. The first end 40 of the second lateral link 30 is rotatably coupled to a second bracket 44 fixed to the chassis 12. The second end 42 of the second lateral link 30 is coupled to the crank bar 26 for rotation relative to the crank bar 26 about a third rotational axis A3. The third rotational axis A3 is parallel to and spaced apart from the first and second rotational axes A1, A2. As shown in FIG. 1, a straight line L can be drawn that intersects each of the first, second and third rotational axes A1, A2, A3.

When the vehicle 10 is at rest (i.e., not moving) and the wheels 22 connected to the axle assembly 14 are resting on level ground, the first and second lateral links 28, 30 are parallel to each other (i.e., longitudinal axes of the first and second lateral links 28, 30 are parallel to each other). When the axle assembly 14 moves relative to the chassis 12 (e.g., in response to the wheels 22 rolling over a bump or dip in the roadway, acceleration or deceleration of the vehicle 10, and/or turning or cornering of the vehicle 10), the crank bar 26 will rotate about the first rotational axis A1 relative to the axle assembly 14, which causes corresponding rotation of the first and second lateral links 28, 30 relative to the crank bar 26 and the first and second brackets 38, 44.

Referring now to FIGS. 2-5, a vehicle 110 according to the principles of the present disclosure is provided. The vehicle 110 includes a chassis 112, an axle assembly 114, and a suspension 116. While not shown in the figures, the chassis 112 can support a body of the vehicle and a propulsion system (e.g., an engine or motor). The axle assembly 114 can include first and second axles 118, 120, and a differential 121 that couples the first and second axles 118, 120 to a driveshaft (not shown) driven by the propulsion system. In this manner, movement of the driveshaft can be transmitted to wheels (not shown) attached to the first and second axles 118, 120.

The suspension 116 may include a plurality of springs 123 (e.g., coil springs or leaf springs) and/or dampers (e.g., shock absorbers) for damping movement of the axle assembly 114 relative to the chassis 112. The suspension 116 also includes a linkage 124 that restricts lateral movement (i.e., movement in a direction parallel to or along a line extending through lateral sides 111, 113 of the chassis 112) of the axle assembly 114 relative to the chassis 112.

Figure 3:
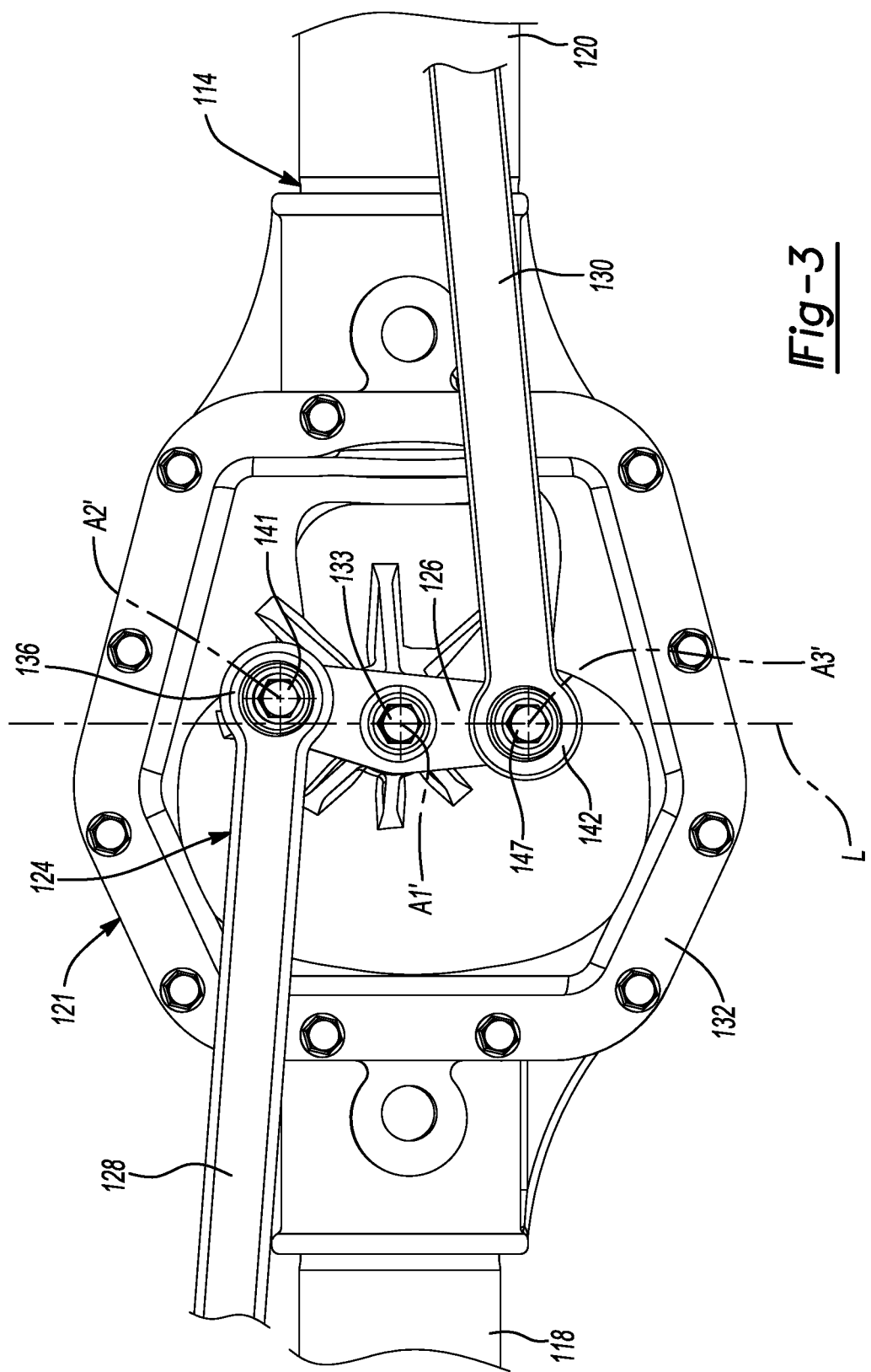
FIG. 3 is a close-up view of a differential housing and a portion of the Watt's linkage of FIG. 2.
Figure 4:
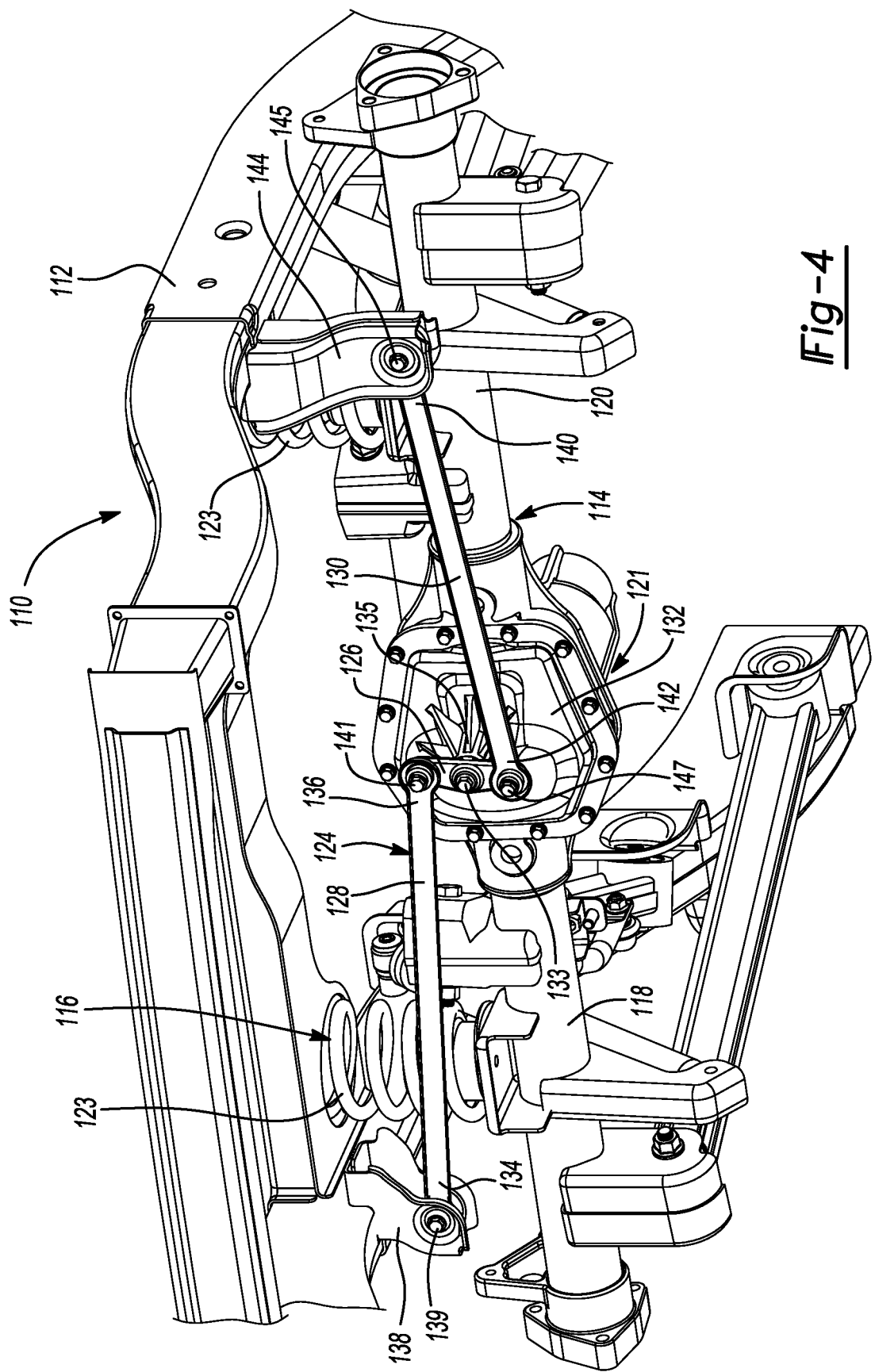
FIG. 4 is a partial perspective view of the vehicle of FIG. 2.
Figure 5:
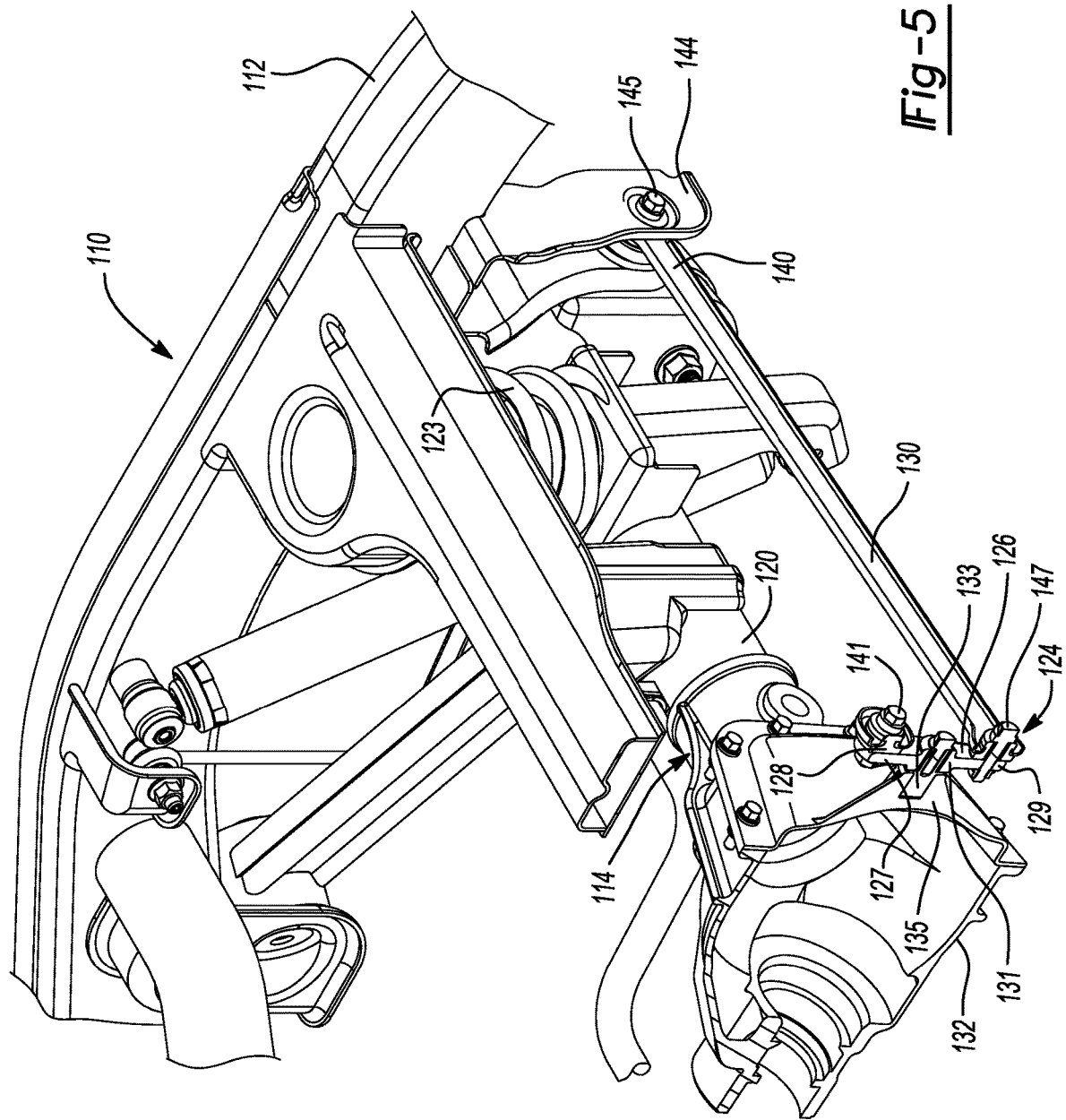
FIG. 5 is a cross-sectional perspective view of a portion of the vehicle of FIG. 2.

The linkage 124 may include a crank bar 126, a first lateral link 128, and a second lateral link 130. The crank bar 126 is mounted to the axle assembly 114 (e.g., to a housing 132 of the differential 121 or to an axle tube) for rotation relative to the axle assembly 114 about a first rotational axis A1' (FIG. 3). As shown in FIG. 5, the crank bar 126 may be a rigid member having a first end portion 127, a second end portion 129, and an intermediate portion 131 disposed between the first and second end portions 127, 129. As shown in FIG. 5, a pivot 133 (e.g., a pin or a fastener and bushing) may extend through an aperture in the intermediate portion 131 and may engage a boss 135 formed on the housing 132. The pivot 133 may define the first rotational axis A1'.

Figure 2:
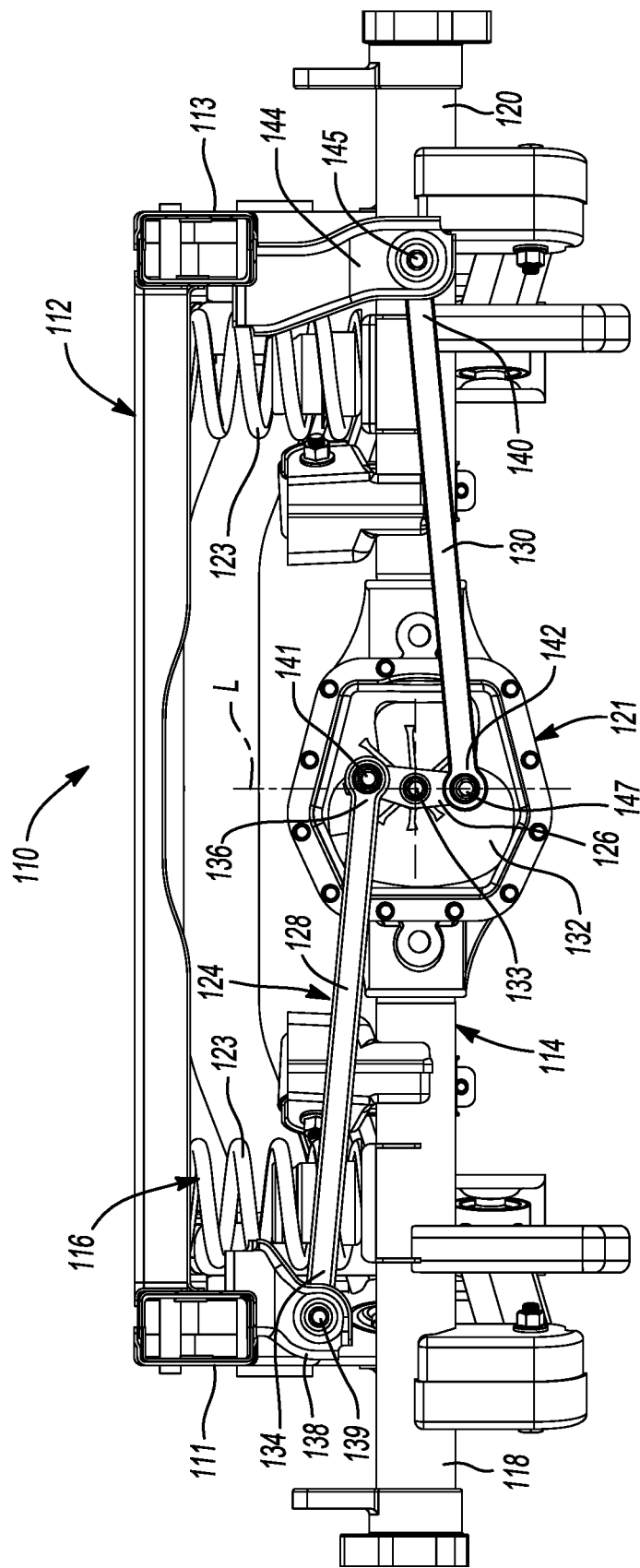
FIG. 2 is a rear view of a portion of another vehicle including a suspension having a Watt's linkage according to the principles of the present disclosure.

The first lateral link 128 may be a rigid, elongated member having a first end 134 and a second end 136 (FIG. 2). The first end 134 is rotatably coupled to a first bracket 138 by a pivot 139. The first bracket 138 may be fixedly attached to or integrally formed with the chassis 112 (e.g., at or near a first lateral end of the chassis 112). The second end 136 of the first lateral link 128 may be coupled to the first end portion 127 of the crank bar 126 by another pivot 141 for rotation relative to the crank bar 126 about a second rotational axis A2' (FIG. 3). The second rotational axis A2' is defined by the pivot 141. The second rotational axis A2' is parallel to and spaced apart from the first rotational axis A1'.

The second lateral link 130 may be a rigid, elongated member having a first end 140 and a second end 142 (FIG. 2). The first end 140 is rotatably coupled to a second bracket 144 by a pivot 145. The second bracket 144 may be fixedly attached to or integrally formed with the chassis 112 (e.g., at or near a second lateral end of the chassis 112). The second end 142 of the second lateral link 130 may be coupled to the second end portion 129 of the crank bar 126 by another pivot 147 for rotation relative to the crank bar 126 about a third rotational axis A3' (FIG. 3). The third rotational axis A3' is defined by the pivot 147. The third rotational axis A3' is parallel to and spaced apart from the first and second rotational axes A1', A2'. As shown in FIG. 3, a straight line L can be drawn that intersects the first and third rotational axes A1', A3', but does not intersect the second rotational axis A2'. Other straight lines (not shown) can be drawn that intersect any two of the axes A1', A2', A3', but no straight line can be drawn that intersects all three of the rotational axes A1', A2', A3'. The straight line L shown in FIGS. 2 and 3 extends through the first and third rotational axes A1', A3' and is disposed laterally between the second rotational axis A2' and the first bracket 138.

When the vehicle 110 is at rest (i.e., not moving) and the wheels connected to the axle assembly 114 are resting on level ground, the first and second lateral links 128, 130 are angled relative to each other (i.e., longitudinal axes of the first and second lateral links 128, 130 are disposed at non-perpendicular and non-zero angles relative to each other). When the axle assembly 114 moves relative to the chassis 112 (e.g., in response to the wheels rolling over a bump or dip in the roadway, acceleration or deceleration of the vehicle 110, and/or turning or cornering of the vehicle 110), the crank bar 126 will rotate about the first rotational axis A1' relative to the axle assembly 114, which causes corresponding rotation of the first and second lateral links 128, 130 relative to the crank bar 126 and the first and second brackets 138, 144. Such rotation of the crank bar 126 and the first and second lateral links 128, 130 forces the movement of the axle assembly 114 relative to the chassis 112 to be in an approximately vertical direction (i.e., a direction perpendicular to the ground upon which the wheels are disposed) relative to the chassis 112.

Figure 6:
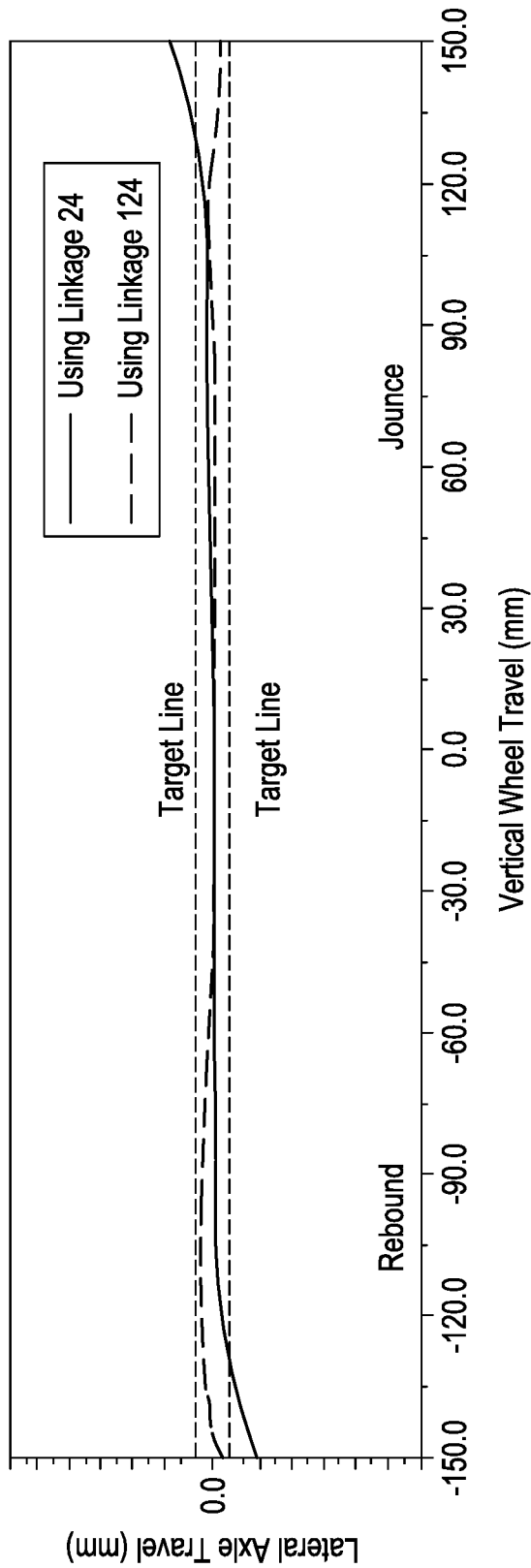
FIG. 6 is a graph depicting lateral travel versus vertical travel for an axle assembly of the vehicle of FIG. 1 and for an axle assembly of the vehicle of FIGS. 2-5.

Like the linkage 24 of FIG. 1, the linkage 124 of FIGS. 2-5 limits lateral movement of the axle assembly 114 relative to the chassis 112 while allowing vertical movement of the axle assembly 114 relative to the chassis 112. However, configuring the linkage 124 as described above and shown in FIGS. 2-5 (i.e., angling the first and second lateral links 128, 130 relative to each other and forming the crank bar 126 such that a straight line of infinite length intersecting two of the rotational axes A1', A2', A3' cannot intersect a third one of the rotational axes A1', A2', A3') allows the linkage 124 to limit lateral movement of the axle assembly 114 relative to the chassis 112 more than the linkage 24 of FIG. 1 is able to limit lateral movement of the axle assembly 14 relative to the chassis 12. That is, as shown in FIG. 6, the linkage 124 of FIGS. 2-5 causes the movement of the axle assembly 114 relative to the chassis 112 to more closely approximate perfect vertical movement when compared to the movement of the axle assembly 14 relative to the chassis 12 directed by the linkage 24 of FIG. 1. Furthermore, as shown in FIG. 6, the linkage 124 of FIGS. 2-5 is able to keep any lateral travel of the axle assembly 114 relative to the chassis 112 within a target range (i.e., a range within target lines shown in FIG. 6) over a greater range of vertical movement than the linkage 24 in both a jounce direction and in a rebound direction.

Furthermore, the angled configuration of the first and second lateral links 128, 130 (i.e., the fact that the first and second lateral links 128, 130 are angled relative to each other as described above) allows the first and second brackets 138, 144 to be shorter than the first and second brackets 38, 44 shown in FIG. 1 (i.e., the first and second brackets 38, 44 of FIG. 1 extend vertically downward from the chassis 12 further than the first and second brackets 138, 144 of FIGS. 2-5 extend vertically downward from the chassis 112). The shorter brackets 138, 144 advantageously increase the stiffness of the suspension 116 and allow the linkage 124 to fit within a smaller envelope.

The foregoing description of the embodiments has been provided for purposes of illustration and description. It is not intended to be exhaustive or to limit the disclosure. Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure.

What is claimed is:

1. A suspension for a vehicle, the suspension comprising:
a crank bar mounted to an axle assembly of the vehicle and rotatable relative to the axle assembly about a first rotational axis;

a first lateral link including a first end rotatably coupled to a first bracket fixed to a chassis of the vehicle and a second end coupled to the crank bar for rotation relative to the crank bar about a second rotational axis, the second rotational axis is parallel to and spaced apart from the first rotational axis; and a second lateral link including a third end rotatably coupled to a second bracket fixed to the chassis of the vehicle and a fourth end coupled to the crank bar for rotation relative to the crank bar about a third rotational axis, the third rotational axis is parallel to and spaced apart from the first and second rotational axes, wherein a straight line intersecting the first rotational axis and one of the second and third rotational axes does not intersect the other of the second and third rotational axes, and wherein the straight line has an infinite length, wherein the straight line intersects the first rotational axis and the third rotational axis and is disposed laterally between the second rotational axis and the first bracket.

2. The suspension of claim 1, wherein the crank bar rotates relative to the axle assembly in response to relative movement between the axle assembly and the chassis.

3. The suspension of claim 1, wherein the first lateral link is disposed at a non-perpendicular and non-zero angle relative to the second lateral link.

4. The suspension of claim 3, wherein the first lateral link is disposed vertically higher than the second lateral link.

5. The suspension of claim 4, wherein the second rotational axis extends through a first end of the crank bar, wherein the third rotational axis extends through a second end of the crank bar, and wherein the first rotational axis extends through an intermediate portion of the crank bar disposed between the first and second ends of the crank bar.

6. The suspension of claim 1, wherein the first and second brackets are disposed at opposite lateral ends of the chassis.

7. The suspension of claim 6, wherein the crank bar is rotatably mounted on a differential housing of the axle assembly disposed laterally between the opposite lateral ends of the chassis.

8. The suspension of claim 1, wherein the first and second lateral links are rigid members having fixed lengths.

9. The suspension of claim 1, wherein the first and second lateral links are disposed at non-perpendicular and non-zero angles relative to a longitudinal axis of the axle assembly.

10. A vehicle comprising:
a chassis including a first lateral end having a first rigid bracket extending therefrom and a second lateral end having a second rigid bracket extending therefrom;
an axle assembly movably connected to the chassis;
a plurality of springs connected to the chassis and the axle assembly and dampening relative movement between the chassis and the axle assembly;
a crank bar mounted to the axle assembly and rotatable relative to the axle assembly about a first rotational axis;
a first lateral link including a first end rotatably coupled to the first rigid bracket and a second end coupled to the crank bar for rotation relative to the crank bar about a second rotational axis, the second rotational axis is parallel to and spaced apart from the first rotational axis; and
a second lateral link including a third end rotatably coupled to the second rigid bracket and a fourth end coupled to the crank bar for rotation relative to the crank bar about a third rotational axis, the third rotational axis is parallel to and spaced apart from the first and second rotational axes,
wherein the first, second and third rotational axes are positioned relative to each other such that a straight line having an infinite length intersects only two of the first, second and third rotational axes, wherein the straight line intersects the first rotational axis and the third rotational axis and is disposed laterally between the second rotational axis and the first rigid bracket.

11. The vehicle of claim 10, wherein the crank bar rotates relative to the axle assembly in response to relative movement between the axle assembly and the chassis.

12. The vehicle of claim 10, wherein the first lateral link is disposed at a non-perpendicular and non-zero angle relative to the second lateral link.

13. The vehicle of claim 12, wherein the first lateral link is disposed vertically higher than the second lateral link.

14. The vehicle of claim 13, wherein the second rotational axis extends through a first end of the crank bar, wherein the third rotational axis extends through a second end of the crank bar, and wherein the first rotational axis extends through an intermediate portion of the crank bar disposed between the first and second ends of the crank bar.

15. The vehicle of claim 10, wherein the crank bar is rotatably mounted on a differential housing of the axle assembly disposed laterally between the opposite lateral ends of the chassis.

16. The vehicle of claim 10, wherein the first and second lateral links are rigid members having fixed lengths.

17. The vehicle of claim 10, wherein the first and second lateral links are disposed at non-perpendicular and non-zero angles relative to a longitudinal axis of the axle assembly.

* * * * *